United States Patent
Koo et al.

(10) Patent No.: US 6,243,262 B1
(45) Date of Patent: *Jun. 5, 2001

(54) SOUND MUFFLING AND HEAT-DISCHARGING CASE FOR COMPUTER STORAGE DEVICE

(75) Inventors: Jung Ho Koo; Deok Gyu Choi, both of Seoul; Hyun-Ho Lee; In Ha Sung, both of Sungnam, all of (KR)

(73) Assignee: LG Electronics Inc., Seoul (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/327,632

(22) Filed: Jun. 8, 1999

(30) Foreign Application Priority Data

Jul. 30, 1998 (KR) .................................. 98/30874
Jul. 30, 1998 (KR) .................................. 98/30876

(51) Int. Cl.$^7$ ...................................... H05K 7/20
(52) U.S. Cl. .................. 361/687; 361/683; 361/688; 361/704; 361/736; 361/752; 165/185; 174/16.3; 181/151
(58) Field of Search .................... 361/685, 687, 361/690, 709–710, 717–720, 736, 752, 683–695, 713–723; 165/80.3, 185; 174/52.2, 16.3; 181/151, 200, 202, 282, 283; 360/97.01, 97.02, 106, 97.03; 264/112, 300, 272.11, 277, 278; 29/402.02, 402.06, 840, 841, 865; 384/536, 582; 310/67 R; 369/247; 428/316.6, 317.7, 319.3, 421, 422, 461; 257/713–719

(56) References Cited

U.S. PATENT DOCUMENTS

| | | | |
|---|---|---|---|
| 3,912,278 | * 10/1975 | Teutsch ................. | 274/1 R |
| 5,161,770 | * 11/1992 | Morehouse et al. ......... | 248/632 |
| 5,187,643 | * 2/1993 | Shou ..................... | 361/391 |
| 5,282,100 | * 1/1994 | Tacklind et al. .......... | 360/97.02 |
| 5,473,507 | * 12/1995 | Schwegler et al. ......... | 361/690 |
| 5,491,608 | * 2/1996 | Koyanagi et al. .......... | 361/685 |
| 5,508,477 | * 4/1996 | Kato et al. .............. | 181/205 |
| 5,510,954 | 4/1996 | Wyler . | |
| 5,587,854 | * 12/1996 | Sato et al. .............. | 360/97.01 |
| 5,644,472 | * 7/1997 | Klein .................... | 361/695 |
| 5,666,239 | * 9/1997 | Pottebaum ................ | 360/97.03 |
| 5,673,172 | * 9/1997 | Hastings et al. .......... | 361/685 |
| 5,744,213 | * 4/1998 | Nelson ................... | 428/131 |
| 5,761,184 | * 6/1998 | Dauber et al. ............ | 369/247 |
| 5,781,373 | * 7/1998 | Larson et al. ............ | 360/97.02 |
| 5,870,247 | * 2/1999 | Schirle .................. | 360/97.01 |
| 5,898,572 | * 4/1999 | Shennib et al. ........... | 361/713 |
| 5,953,206 | * 9/1999 | Jondrow .................. | 361/687 |
| 5,965,249 | * 10/1999 | Sutton et al. ............ | 428/304.4 |
| 5,982,580 | * 11/1999 | Woldemar et al. .......... | 360/97.02 |
| 6,005,768 | * 12/1999 | Jo ....................... | 361/685 |
| 6,021,612 | * 2/2000 | Dunn et al. .............. | 52/144 |

FOREIGN PATENT DOCUMENTS

09221833 * 3/1999 (JP) .................. G11B/0/08

* cited by examiner

Primary Examiner—Leo P. Picard
Assistant Examiner—Michael Datskovsky

(57) ABSTRACT

A sound muffling and heat-discharging case for a computer storage apparatus includes a casing having an opened upper portion and receiving the storage apparatus therein, a cover having a severed side portion partially exposing the peripheral parts of the storage apparatus and serving as a heat discharging portion and covering an upper portion of the casing, and noise-absorbing member being provided along an inner periphery of each of the casing and the cover and absorbing a noise from the storage apparatus. The sound muffling and heat-discharging case effectively decreases noise and heat occurring from a hard disk drive while simplifying the case structure of and thereby facilitating its fabrication.

7 Claims, 4 Drawing Sheets

SOUND MUFFLING AND HEAT-DISCHARGING CASE FOR COMPUTER STORAGE DEVICE

BACKGROUND OF THE INVENTION

1. Field of the Invention

The present invention relates to a computer storage device, and more particularly, to a sound muffling and heat-discharging case for a computer storage device, capable of effectively processing noise and heat from a hard disk drive by simplifying a case structure housing the hard disk drive therein, thereby facilitating product fabrication.

2. Description of the Background Art

Generally, a computer system includes a variety of storage devices therein and such devices are protected using appropriate cases.

According to noise level measurements of computers, it is known that a high level of noise is related to computer parts such as a hard disk assembly and a disk drive including a disk driving motor.

With reference to the accompanying drawings, a general hard disk drive will now be explained.

FIG. 1 is an exploded perspective view illustrating a general hard disk drive. The disk drive is normally in one unit and not generally disassembled. Here, the exploded view is provided merely to assist in understanding when noise occurs.

As shown therein, the hard disk drive includes: an upper cover 1; a disk assembly 2 having a plurality of platters 2a for recording magnetized data therein; a head assembly 3 having a plurality of heads 3a to facilitate the data reading and writing of the platters 2a in correspondence to rotating positions of the platters 2a; a spindle motor 4 disposed at a lower portion of the disk assembly 2 and spinning the platters 2a; a base casing 5 housing the above elements therein and engaged by the upper cover 1 so as to protect the internally contained elements from the exterior environment; and a printed circuit board (PCB) 6 disposed underneath the base casing 5, with the PCB component side 6a facing downwardly.

The thusly constituted hard disk drive generates noise when operating. Specifically, when inputting/outputting data into/from the disk assembly 2, the spindle motor 4 is rotated to rotate the disk assembly 2. That is, the noise occurs due to respective mechanical movements of the spindle motor rotation, the disk assembly rotation and the parts related to data input/output.

In such a conventional hard disk drive for a computer, the noise which occurs from its interior does not sound loud compared to a general noise level so that a noise reduction device is not installed so as to save production cost.

However, as computers are becoming more highly functional in recent years, the hard disk implements a high speed operation and accordingly noise and heat are on the increase. Further, as higher quality computer systems are required, the market demands lower noise computers.

As described above, the general hard disk drive is not provided with an additional device for solving the problems noise from the platter rotation, mechanical operation of the head assembly and spindle motor rotation, and the heat from PCB. As a result, users are disturbed by noise pollution and the generated heat may incur an erroneous operation of the computer system, thereby deteriorating product reliability.

In order to overcome such problems, there has been provided a sound muffling and heat-discharging case which houses a hard disk drive, and its structure will now be described with reference to FIG. 2.

FIG. 2 is a cross-sectional view of a conventional sound muffling and heat-discharging case and a hard disk drive provided therein as disclosed in U.S. Pat. No. 5,510,954.

As shown therein, a multi-layered muffling member 20 is formed covering a disk drive 10 and an outer casing 30 formed of an acrylic flexible material is disposed covering the muffling member 20 so as to sufficiently absorb noise and vibration from the hard disk drive.

The muffling member 20 includes a muffling element 21 having a high thermal conductivity for conducting away the heat generated by the hard disk drive. There is also provided a heat transfer member 50 such as a length of copper braid with its one end connected to the muffling member 21 and the other end thereof externally exposed through the muffling member 20 and the outer casing 30 so that the absorbed heat from the muffling member 21 can be discharged to the exterior of the outer casing 30, In order to increase the discharge of heat being transferred to the exterior of the outer casing 30 through the heat transfer member 50, a heatsink 60 is connected to the heat transfer member 50.

The sound muffling and heat-discharging case structure according to the conventional art obtains decreased noise since the noise from the hard disk drive 10 is absorbed into the muffling member 20 and since the heat from the hard disk drive 10 is externally discharged through the muffling member 21, the heat transfer member 50 and the heatsink 60, so that the internal temperature of the hard disk drive is not raised.

However, such a conventional sound muffling and heat-discharging case structure for a computer storage apparatus disadvantageously requires many parts, thereby complicating the structure, and thereby increasing the necessary labor and production cost.

Further, the use of an additional heatsink disposed for heat discharge increases the product size and the heat-discharging effect tends to be deteriorated since there is provided only one heat discharge structure.

SUMMARY OF THE INVENTION

The present invention is directed to overcoming the conventional disadvantages. Therefore, it is an object of the present invention to provide a sound muffling and heat-discharging case for a computer storage apparatus capable of effectively processing noise and heat occurring from a hard disk drive while simplifying a case structure of the storage apparatus and thereby facilitating its fabrication.

To achieve the above-described object, there is provided a sound muffling and heat-discharging case for a computer storage apparatus according to the present invention which includes a casing having an opened upper portion and receiving peripheral parts of the storage apparatus therein, a cover having a severed side portion so as to partially expose the peripheral parts of the storage apparatus and serving as a heat discharging member and covering an upper portion of the casing, and a noise-absorbing element being provided along inner periphery of an each of the casing and the cover and shielding a noise from the peripheral parts of the storage apparatus.

The features and advantages of the present invention will become more readily apparent from the detailed description given hereinafter. However, it should be understood that the detailed description and specific example, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE PREFERRED EMBODIMENTS

With reference to the accompanying drawings, the sound muffling and heat-discharging case for a computer storage apparatus according to the present invention will now be described.

Figure 1:
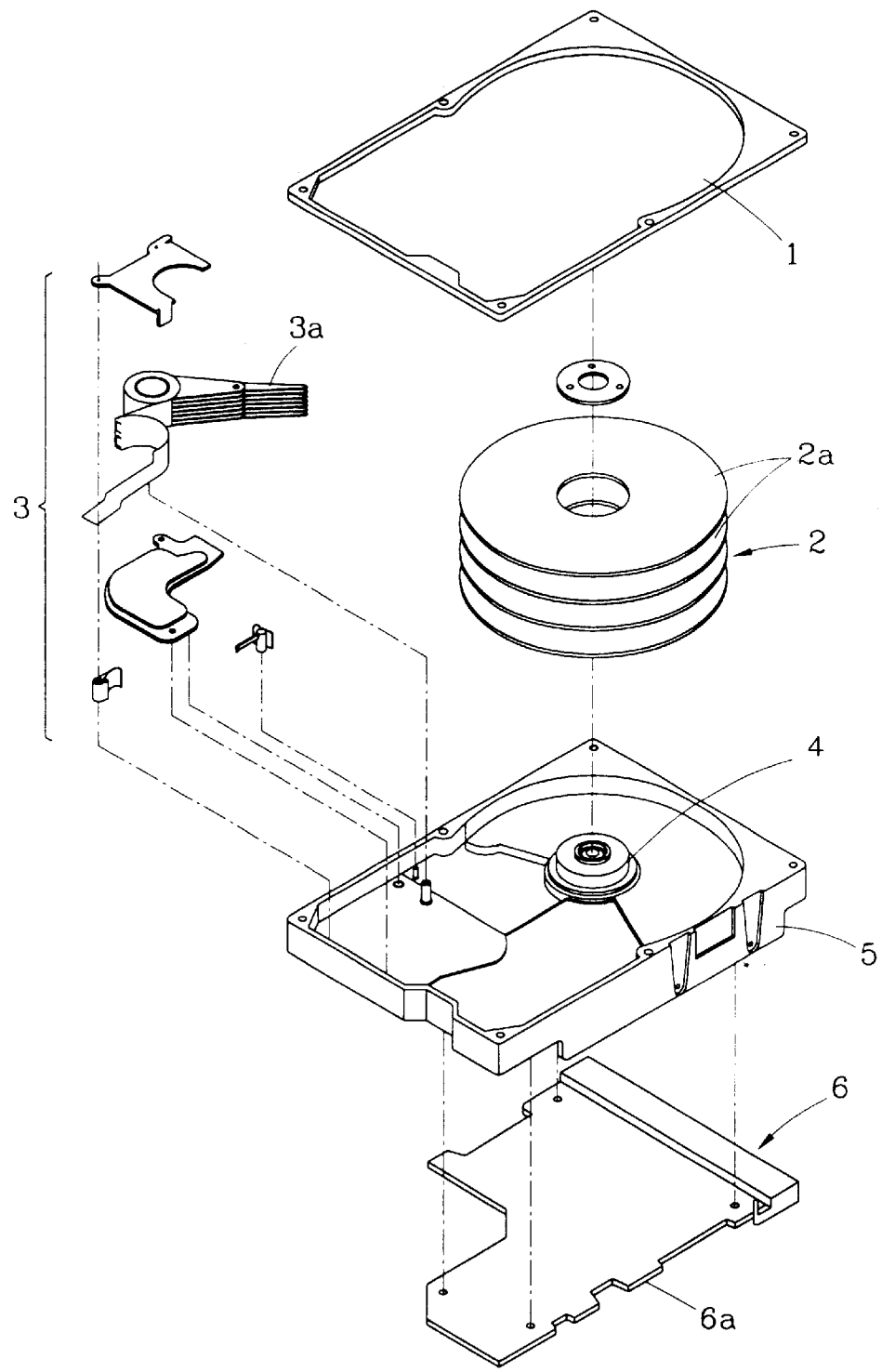
FIG. 1 is an exploded perspective view illustrating a general hard disk drive assembly.
Figure 2:
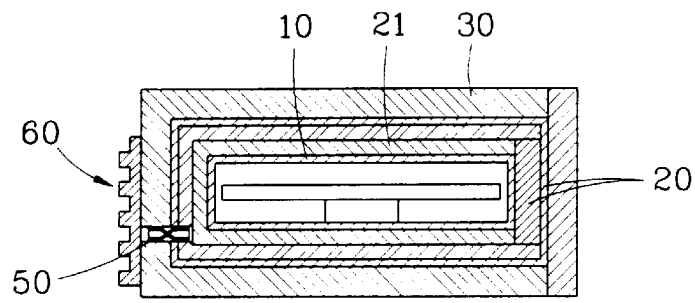
FIG. 2 is a cross-sectional view illustrating a sound muffling and heat-discharging case and a hard disk drive provided therein according to the conventional art.
Figure 3:
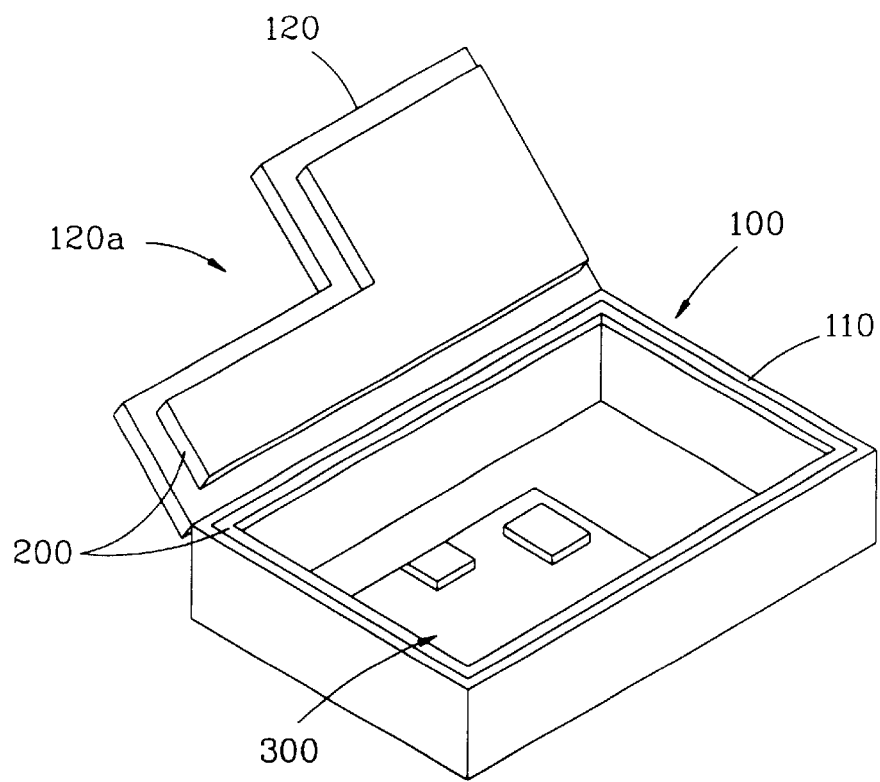
FIG. 3 is a perspective view illustrating a sound muffling and heat-discharging case for a computer storage apparatus according to a first embodiment of the present invention.
Figure 4:
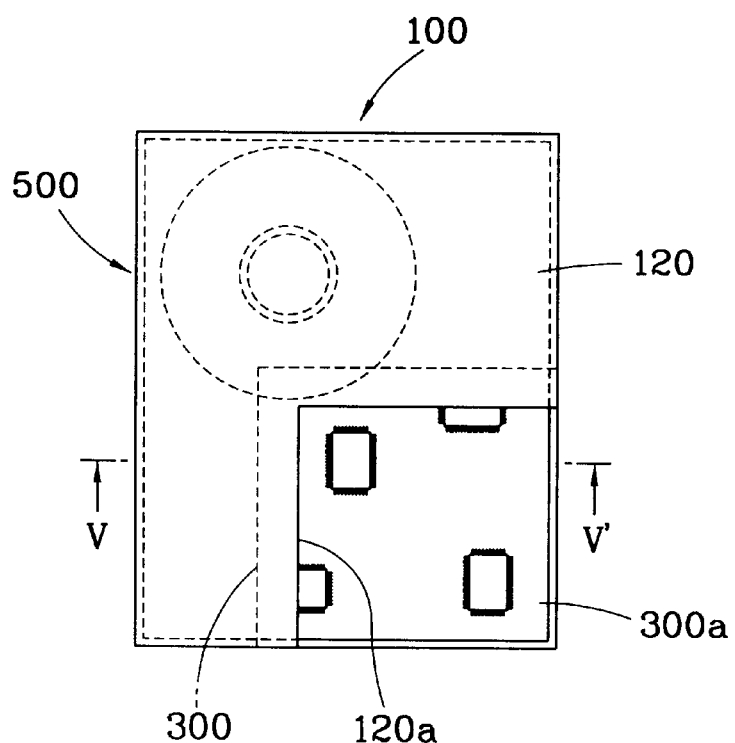
FIG. 4 is a plan view illustrating the sound muffling and heat-discharging case for a computer storage apparatus according to the first embodiment of the present invention.
Figure 5:
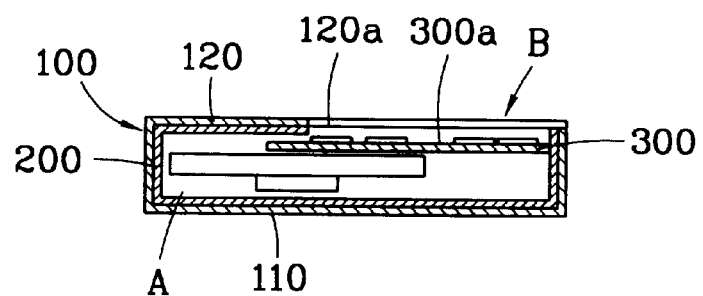
FIG. 5 is a cross-sectional view taken along line V—V' in FIG. 4.

FIG. 3 is a perspective view illustrating a sound muffling and heat-discharging case for a computer storage apparatus according to a first embodiment of the present invention, FIG. 4 is a plan view illustrating the sound muffling and heat-protecting case for a computer storage apparatus according to the first embodiment of the present invention, and FIG. 5 is a cross-sectional view taken along line V—V' in FIG. 4.

As shown therein, the sound muffling and heat-protecting case 100 for a computer storage apparatus according to the present invention includes a casing 110 for receiving a hard disk drive (not shown in FIG. 3) therein, a cover 120 having a portion thereof severed, that is, opened, to form a heat discharging port 120a which is cut out of a side portion of the cover 120 and detachably connected to another side of the casing 110 for thereby covering the upper portion of the casing 110 and noise absorbing members 200 attached along the inner peripheries of the casing 110 and the cover 120.

In the drawings and associated written description hereinbelow, most of the hard disk drive is omitted so that the features of case 100 can be seen clearly. However, PCB 300 having component side 300a of the hard disk drive is illustrated in the drawings to illustrate the role of heat discharging port 120a, as is discussed in detail below.

Here, when installing the hard disk drive (not shown in FIG. 3), a PCB 300 as part of the disk drive, wherein the component side 300a of the PCB 300 is exposed at the heat discharging port 120a.

Also, the heat discharging port 120a is formed so as not to externally expose more than 80% of the area of the PCB component side 300a.

The heat discharging port 120a is formed in the cover 120 to discharge heat occurring from operation of the hard disk drive (not shown) installed in the case 100.

That is, heat generating portions of the hard disk drive (not shown) are respective circuit parts mounted on the component side 300a of the PCB 300, thereby externally exposing the respective circuit parts mounted on the PCB 300.

Here, the noise-absorbing member 200 is formed of rubber material so as to strongly absorb and attenuate frequency bands of noise from the driving parts of a spindle motor (not shown) serving as a component of the hard disk drive (not shown), and the case 100 is formed of a material that effectively resists impact, heat, drop and electric shock.

As shown in FIG. 5, according to a theoretical and experimental consideration as to the selection of the case 100, a portion A wherein driving parts of the disk drive are located has less heat and more noise, and a portion B where the disk drive PCB 300 is located has more heat and less noise.

In other words, the portion A includes mechanical parts such as a spindle motor (not shown), a plurality of platters (not shown) and a head assembly (not shown) for inputting/outputting data to the platters, and generates significant noise caused by rotation and friction when the driving parts are operated. The typical noise level of each manufacturer's disc drive ranges from 36 dB to 42 dB.

Whereas, the portion B has electronic parts such as the PCB 300 mounted thereon for processing hard disk operating signals and control signals, and it generates a significant amount of heat but the level of noise generated therefrom is relatively low in comparison to the portion A since the PCB 300 itself partially serves to block the noise from the portion A.

Therefore, when the hard disk drive (not shown) is mounted in the case 100 and is operated, most noise from the hard disk drive (not shown) is blocked by the noise-absorbing members 200 attached to the case 110 and cover 120 and also the heat generated from the hard disk drive (not shown) is soft-transferred and discharged to the exterior by a natural convection since a portion of the cover 120 is opened.

In particular, because of the natural convection wherein air with a higher temperature than the ambient air rises, the heat generated from the hard disk drive (not shown) is upwardly discharged through the severed portion 120a of the upper cover 120.

According to the first embodiment of the present invention, a portion 120a of the cover 120 that corresponds to the PCB 300 is thoroughly severed. It is also possible to form a plurality of heat discharging holes, openings or vents in the cover 120 that corresponds to the location of the PCB component side 300a without severing the cover 120.

The case 100 is designed to accommodate 5.25 inch hard disks which are currently on the market and it is also applicable to 3.5 inch hard disks with the same effects.

That is, the case 100 can also be implemented to accommodate to 3.5 inch hard disk.

Figure 6:
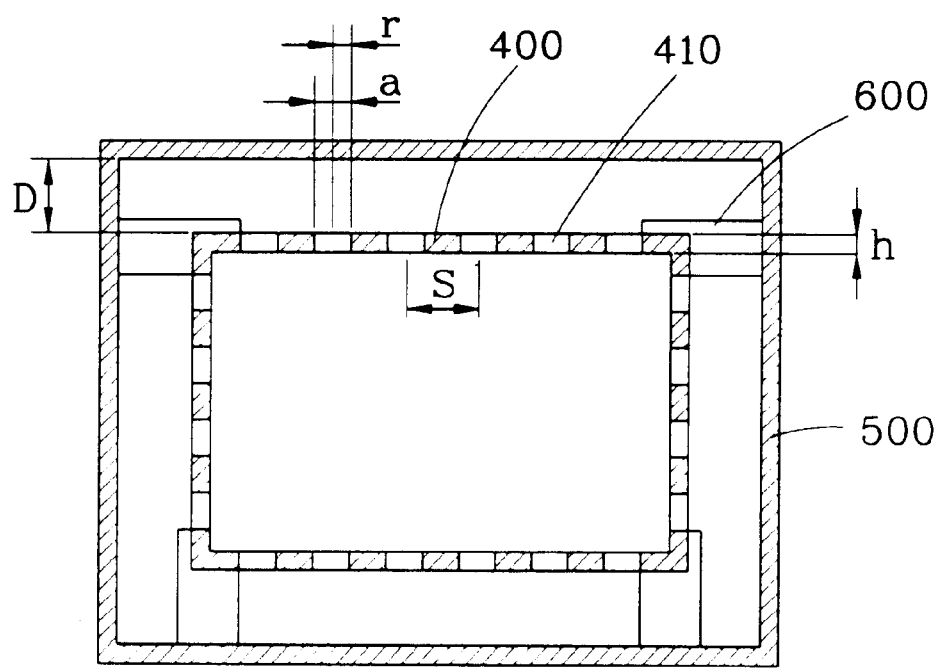
FIG. 6 is a cross-sectional view illustrating a sound muffling and heat-discharging case for a computer storage apparatus according to a second embodiment of the present invention.

With reference to FIG. 6, the sound muffling and heat-discharging case for a computer storage apparatus according to the second embodiment of the present invention will now be described.

FIG. 6 is a cross-sectional view illustrating the sound muffling and heat-discharging case for a computer storage apparatus according to the second embodiment of the present invention.

First, the sound muffling and heat-discharging case according to the second embodiment employs a Helmholtz resonance characteristic and includes, as shown in FIG. 6, an inner casing 400 for receiving a hard disk drive therein, an outer casing 500 enclosing the inner casing 400, and may, for example, include a plurality of support ribs 600 by which the inner casing 400 is supportedly mounted in the outer casing 500.

A plurality of holes, orifices, openings or ports 410 are formed the sides of the inner casing 400 and a hard disk drive (not shown) is in tended to be mounted in the inner casing 400.

The inner and outer casings 400, 500 are constructed so as to form a Helmholtz resonator, the Helmholtz resonance characteristic of which satisfies the following equations 1 through 3:

$$f_R = \frac{c}{2\pi} \sqrt{\frac{P}{D(h+1.8r)}} \quad (1)$$

$$p = \frac{\pi}{4}\left(\frac{a}{S}\right)^2 \quad (2)$$

$$a = 2r \quad (3)$$

wherein, $f_R$ denotes a resonant frequency for absorbing noise generated from the hard disk drive, c denotes the sound velocity of sound in the air, P denotes the porosity, r denotes the radius of each hole 410, a denotes the diameter of the hole 410, S denotes an interhole distance, h denotes a thickness of the inner casing 400, and D denotes the distance between the inner casing 400 and the outer casing 500.

Particularly, $f_R$ is preferably the frequency of the highest amplitude noise component of the noise generated from the hard disk drive.

For example, in order to decrease a noise with a frequency band of 3 KHz, if D=5 mm, h=1.5 mm, and S=10 mm, the radius r of the holes 410 becomes 1.4 mm, whereby a frequency band of 3 KHz noise can be attenuated.

That is, when the frequency of the highest amplitude noise component from the hard disk drive (not shown) is selected and employed in correspondence to the construction of inner casing 400, the noise of the highest amplitude frequency band is attenuated, thereby decreasing the entire noise level of a computer.

Also, the hard disk drive (not shown) generates heat resulting from a mechanical operation and current flow. The heat is discharged through the holes 410 formed in the inner casing 400 to the exterior space by a natural convection thus removing heat from the hard disk drive.

Meanwhile, when a particular part among the plurality of driving parts of the hard disk drive (not shown) generates a particular frequency band of noise, holes having a predetermined radius may be formed in the inner casing 400 adjacent thereto or holes with different radii may be disposed at random or regularly.

As described above, the sound muffling and heat-discharging case for a computer storage apparatus according to the present invention effectively muffles noise and discharges heat from the hard disk drive and its simplified structure facilitates its fabrication.

As the present invention may be embodied in various forms without departing from the spirit of the essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within meets and bounds of the claims, or equivalences of such meets and bounds are therefore intended to be embraced by the appended claims.

What is claimed:

1. A noise muffling and heat-discharging case for a Hard Disk Drive, the Hard Disk Drive having a base casing, and a disk assembly, a head assembly, and a spindle motor for driving the disk assembly which are installed in the base casing, and a printed circuit board which is connected to the head assembly and spindle motor and is located on an exterior of the base casing, the noise muffling and heat-discharging case comprising:

a case for receiving the Hard Disk Drive therein, said case having an open side;

a cover for covering said open side of said case, said cover being contiguous with said case, wherein said cover has a heat discharging portion located in correspondence with a heat generating part of said printed circuit board of said Hard Disk Drive; and a noise-absorbing structure provided along an inner periphery of said case and said cover, for absorbing noise from said Hard Disk Drive.

2. The noise muffling and heat-discharging case of claim 1, wherein the heat discharging portion of said cover comprises an opening in said cover.

3. The noise muffling and heat-discharging case of claim 2, wherein said opening of said heat discharging portion exposes about 80% of an area of the printed circuit board.

4. The noise muffling and heat-discharging case of claim 1, wherein said cover includes an opening formed therein for partially exposing the computer storage apparatus to the exterior to allow heat convection therefrom.

5. A noise muffling and heat-discharging case for a Hard Disk Drive, the Hard Disk Drive having a base casing, and a disk assembly, a head assembly, and a spindle motor for driving the disk assembly which are installed in the base casing, and a printed circuit board which is connected to the head assembly and spindle motor and is located on an exterior of the base casing, the noise muffling and heat-discharging case comprising:

a case defining an internal space for receiving said Hard Disk Drive therein, said case having an open side;

a cover contiguous with said case for closing off said open side of said case, said cover including an opening located so as to expose a heat-generating portion of said printed circuit board; and a noise-absorbing structure provided on one or both of an interior surface of said case and an interior surface of said cover.

6. The case according to claim 5, wherein said Hard Disk Drive includes a printed circuit board, said opening of said cover being located so as to expose a portion of the printed circuit board.

7. The case according to claim 6, wherein said opening is sized and arranged so as to expose about 80% of the printed circuit board.

* * * * *